United States Patent
Taguchi et al.

(10) Patent No.: US 6,813,061 B2
(45) Date of Patent: Nov. 2, 2004

(54) ELECTROSTATIC MACHINE ELEMENT, LIGHT DIFFRACTION MODULATION ELEMENT AND IMAGE DISPLAY DEVICE

(75) Inventors: Ayumu Taguchi, Tokyo (JP); Hitoshi Tamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/445,615

(22) Filed: May 27, 2003

(65) Prior Publication Data

US 2004/0032654 A1 Feb. 19, 2004

(30) Foreign Application Priority Data

May 28, 2002 (JP) ........................................ 2002-153962
May 23, 2003 (JP) ........................................ 2003-146968

(51) Int. Cl.[7] .............................................. G02B 26/00
(52) U.S. Cl. ........................ 359/291; 359/295; 359/254; 359/242
(58) Field of Search ............................. 359/242, 251–2, 359/254, 265–9, 271, 283, 290–7

(56) References Cited

U.S. PATENT DOCUMENTS

| | | | | |
|---|---|---|---|---|
| 5,323,999 A | * | 6/1994 | Bonne et al. ................. | 251/11 |
| 5,459,610 A | | 10/1995 | Bloom et al. ................ | 359/572 |
| 5,818,473 A | * | 10/1998 | Fujii et al. ..................... | 347/11 |
| 5,841,579 A | | 11/1998 | Bloom et al. ................ | 359/572 |
| 5,949,570 A | * | 9/1999 | Shiono et al. ............... | 359/291 |
| 6,144,481 A | | 11/2000 | Kowarz et al. .............. | 359/291 |
| 6,233,087 B1 | | 5/2001 | Hawkins et al. ............ | 359/290 |
| 6,496,348 B2 | * | 12/2002 | McIntosh ..................... | 361/115 |

* cited by examiner

*Primary Examiner*—Jordan M. Schwartz
*Assistant Examiner*—Jessica Stultz
(74) *Attorney, Agent, or Firm*—Frommer Lawrence & Haug LLP; William S. Frommer; Samuel H. Megerditchian

(57) ABSTRACT

Providing an electrostatic machine element for restraining deteriorations of practical electrostatic forces between electrodes by an electrostatic shielded effect to prevent instability of an electrode operation, a light diffraction modulation element using the electrostatic machine element and an image display device using the light diffraction modulation element. An edge and an upper side of a first electrode are opened and a dielectric material, the mobility of which depends on a polarity of an electric charge, is used for a second dielectric film. When a drive voltage such that the electric charge having high mobility moves from one dielectric film to another dielectric film, is applied between the first electrode and a second electrode, a charged particle that arrived at the first dielectric film moves further to the upper side of the first electrode.

16 Claims, 13 Drawing Sheets

ELECTROSTATIC MACHINE ELEMENT, LIGHT DIFFRACTION MODULATION ELEMENT AND IMAGE DISPLAY DEVICE

BACKGROUND OF THE INVENTION

1. Field of the Invention

The present invention relates to an electrostatic machine element, a light diffraction modulation element and an image display device using the same, and for example a light diffraction modulation element like a diffraction grating type light valve reflecting and diffracting light, and a two-dimensional image display device using the same.

2. Description of the Related Art

It is known a method in which luminous flux from a one-dimensional image display element is scanned by a light scanning means and the scanned flux is projected to an image forming means to form a two-dimensional image, for the purpose of improving a resolution of an image in an image forming device like a projector or a printer (U.S. Pat. No. 5,982,553). As the one-dimensional image display element, a grating light valve (GLV) developed by Silicon Light Machine Corporation in U.S.A. is known (Japanese Patent No. 3164824, U.S. Pat. No. 5,841,579).

The GLV is composed of a micro machine phase reflection type diffraction grating utilizing a diffraction phenomenon of light. The GLV has a light switching function, and electrically controls an ON/OFF control of a light to enable a digital image display.

The GLV formed as a one-dimensional array is scanned by a scanning mirror to obtain a two-dimensional image. Therefore, compared with normal two-dimensional display devices, in case of using the GLV, although the number of pixels at a vertical direction are same as that of them, since the number of pixels at a lateral direction may be at least one, the number of pixels needed for displaying a two-dimensional image is small. Further, a size of an electrode portion of the GLV called as a ribbon element is extremely small, so the GLV can display the image at a high resolution, at a high-speed switching and with a broad band width. In addition, the GLV can be operated at a low application voltage, so the GLV has been expected to realize a display device of extremely miniaturization.

The two-dimensional image display device using such the one-dimensional image display element GLV enable an extremely smooth and a natural image expression compared with the normal two-dimensional image display devices, for example a projection type display device using a liquid crystal panel, because boundaries between pixels does not exist in the GLV. Moreover, lasers of red, green and blue as the three primary colors are used as light sources and these lights are mixed to achieve a superior display performance enabling an image expression of extremely broad and natural color reproduction range, which is not achieved by a prior art.

A ribbon element of the GLV is a micro machine driven by electrostatic force and displaced or deformed, and one of fine electrostatic machine elements.

FIGS. 10(a) and (b) are views explaining a structure and an operation of an electrostatic machine element in GLV.

FIG. 10(a) is a schematic cross-section view showing a structure of an electrostatic machine element as the related art. As shown in FIG. 10(a), an electrostatic machine element 100 is formed by a lower electrode 102 as a lower structure composed of a polysilicon on a substrate 101 of silicon or a glass, and a dielectric film 103 for protecting the lower electrode 102 and composed of silicon oxide ($SiO_2$) on the lower electrode 102. Further, the electrostatic machine element 100 is also formed by an upper electrode 105 as an upper structure composed of for example aluminum on a dielectric film 104 composed of silicon nitride (SiN). The dielectric film 104 and the upper electrode 105 compose a single ribbon element. In the state shown in FIG. 10(a), a voltage is not applied between the upper electrode 105 and the lower electrode 102 and the electrostatic machine element 100 is in an OFF state.

FIG. 10(b) is a schematic cross-section view showing a structure of an electrostatic machine element. As shown in FIG. 10(b), when a certain drive voltage is applied between the upper electrode 105 and the lower electrode 102, an electrostatic force (Coulomb force) is caused between the upper electrode 105 and the lower electrode 102 (It is called as an ON state). As a result, for example, the upper electrode 105 is mechanically displaced or deformed (warp) to the lower electrode 102 side. The amount of displacement or deformation (warp) (the movement amount) $a_1$ is nm (nano meter) order and corresponds to a value of a drive voltage. When a plurality of electrostatic machine elements 100 are arranged in parallel, a reflection type diffraction grating is formed by the warp or the movement amount $a_1$ to generate a diffraction light.

FIG. 11(a) is a cross-section view showing an electrostatic machine element at time to and FIG. 11(b) is a cross-section view showing an electrostatic machine element at time $t_1$.

In a micro machine device for forming an opposed electrodes through a dielectric film and performing drive by an electrostatic force like the electrostatic machine element 100, as shown in FIG. 11(a) and (b), a drive voltage is applied to make the upper electrode 105 a high electric potential and the lower electrode 102 a low electric potential to be the ON state. The upper electrode 105 is displaced in a direction of the lower electrode 102 with the distance $a_1$. However, a phenomenon has been observed that the position of the upper electrode 105 is gradually displaced in the direction of a position of the OFF state with the elapse of time.

Specifically, in FIG. 11(a), the drive voltage shown in FIG. 10(b) is applied to displace the upper electrode 105 to the lower electrode 102 side by the distance $a_1$ at the time $t_1$. At time $t_1$ after the elapse of time, the upper electrode 105 is returned in a direction opposed to the lower electrode 102 side to be at a distance $a_2$ smaller than the distance $a_1$ compared with the distance before the drive voltage is applied.

This phenomenon is considered by which the electrostatic force between the upper electrode 105 and the lower electrode 102 is weak.

As shown in FIG. 10(a), in an atmosphere at a high vacuum, molecules existing in low density for example moisture are deposited to the dielectric films 103 and 104. As shown in FIG. 10(b) and FIG. 11(a), when the drive voltage is applied at around 20V for example between the upper electrode 105 and the lower electrode 102, since the distance between the dielectric film 103 and 104 is around 1 $\mu$m, a high electric field at around 20 $V/10^{-4}$ cm=$2\times10^5$ V/cm is formed between the upper electrode 105 and the lower electrode 102.

When the molecules for ionizing regularly in a normal temperature like $H_2O$ molecules adheres to the dielectric films 103 and 104 or floats between the electrodes, the molecules for ionizing regularly described above (charged particles) repeat ionization and bonding in the state of adhering to the surface or floating between the dielectric films 103 and 104 to keep equilibrium of the particles. Even if adding the high voltage described above in this state, these ionized charged particle are restrained by an adhesion force of the dielectric films 103 and 104, so that they cannot immediately apart from the dielectric films 103 and 104. Then, aparting from the dielectric films 103 and 104 with the elapse of time, as shown in FIG. 11(b), the charged particles move between the dielectric films 103 and 104 along with the direction of the electric field.

Specifically, the voltage is applied to the upper electrode 105 at a high electric potential and a low electric potential is applied to the lower electrode 102 as described above, so that a positive charge adhered to the dielectric film 104 of the upper electrode 105 moves to the dielectric film 103 of the lower electrode 102 and a negative charge adhered to the dielectric film 103 of the lower electrode 102 moves to the dielectric film 104 of the upper electrode 105.

According to a movement of electric charges between the upper electrode 105 and the lower electrode 102 described above, the upper electrode 105 and the lower electrode 102 have the respective negative charges and positive charges as a whole. Negative charges and positive charges adhered at the surfaces of the dielectric films 103 and 104 brings about an electric field in a direction opposed to the electric field formed by the drive voltage at a space between the upper electrode 105 and the lower electrode 102. As a result, so-called an electrostatic shielded effect that the available electric field between the upper electrode 105 and the lower electrode 102 is getting weak takes place. Due to the shielded effect, an electrostatic force between the upper electrode 105 and the lower electrode 102 is getting weak and does not enable to keep the upper electrode 105 at the position of the distance $a_1$, as a result the upper electrode 105 is gradually returning to the base position. The electrostatic shielded effect is called a charging phenomenon (charging).

FIG. 12 is a graph showing a change of the movement amount of the upper electrode 105 by the charging phenomenon. In FIG. 12, the x-axis shows a relative value of a drive voltage, the y-axis shows the movement amount of the upper electrode 105 and a unit is $\mu$m. Besides, a solid line shows an assumed movement amount when the charging does not occur, a broken line shows a movement amount when the charging occurs.

Referring to FIG. 12, the graph showing the movement amount of the electrode when the charging occurs has been shifted to a high voltage side than the graph showing the assumed movement amount of the electrode when the charging dose not occur. Besides, the movement amount when the charging occurs decreases drastically than the assumed movement amount when the charging does not occur, in spite of drive voltage being applied same.

A difference between the drive voltage needed when the charging occurs and the drive voltage needed when the charging dose not occur, is called a charging voltage for moving the upper electrode by the predetermined movement amount. FIG. 12 is showing an example of the charging voltage.

FIG. 13 is a graph showing a change of light amounts of diffraction light generated by the GLV element by the charging phenomenon as described above in the GLV element composed of the electrostatic machine element 100. In FIG. 13, the x-axis shows a relative value of a drive voltage and the y-axis shows a relative value of a diffraction light amount. Besides, a solid line shows an assumed diffraction light amount when the charging dose not occur, a broken line shows a diffraction light amount when the charging occur.

Referring to FIG. 13, although the graph showing the assumed diffraction light amount when the charging dose not occur, shows symmetrical with a straight line showing a drive voltage zero. However, the graph showing the diffraction light when the charging occurs shows right shift against a straight line showing a drive voltage zero. Besides, the diffraction light amount when the charging occurs decreases drastically than the assumed diffraction light amount when the charging dose not occur, in spite of being drive voltage applied the same.

As illustrated in FIG. 12, for obtaining the diffraction light of the predetermined amount, a difference between the drive voltage needed when the charging occurs and the drive voltage needed when the charging dose not occur is called a charging voltage for moving the upper electrode to the predetermined diffraction light amount. FIG. 13 is showing an example of the charging voltage.

As a method for solving this problem, it is known a method in which a polarity of the drive voltage is reversed alternately in a short period to ease this phenomenon (U.S. Pat. No. 6,144,481) for example. However, because the voltage applied alternately with the device changes with a time series, for example, even if the polarity of the drive voltage is changed alternately, actual devices are not able to neutralize entirely the influence. Therefore, electric charges accumulated between the upper electrode and the lower electrode increase cumulatively with heterogeneous to cause a phenomenon able to not influence a predetermined electrostatic force at the upper electrode and the lower electrode after a long drive time.

Besides, although it is considered a method in which for example the dielectric films 103 and 104 between the upper electrode and the lower electrode are removed as a method for neutralizing an accumulating electric charge, these methods have practical problems for an influence on reliability of an element, for example.

Besides, although it is considered a method for lacking electric charges in the upper electrode and the lower electrode, it is practically difficult to be lacked in movement electric charge species like migratory ions until a practical using level.

SUMMARY OF THE INVENTIONS

The present invention is made in consideration of the above situation and the present invention has a first object to provide an electrostatic machine element able to restrain deterioration of practical electrostatic force between electrodes by the electrostatic shielded effect to prevent instability of an electrode movement.

Besides, the present invention has a second object to provide a light diffraction modulation element using the electrostatic machine element as described above.

Besides, the present invention has a third object to provide an image display device using the light diffraction modulation element as described above.

To achieve the above objects, the electrostatic machine element of the present invention includes a displaceable or deformable first electrode, a second electrode oppositely arranged to the first electrode, a first dielectric film formed at one side of the first electrode opposed to the second electrode and a second dielectric film formed at one side of the second electrode opposed to the first electrode, said first electrode being displaced or deformed in a direction perpendicular to the second electrode when a voltage between the first and second electrodes is applied and the second dielectric film including dielectric material of which a mobility showing a degree of movement of an electric charge depends on a polarity of the electric charge, the electric charge existing at a surface of the second dielectric film, being aparted from there and moved by an electric field between the first and second electrodes.

According to the electrostatic machine element of the present invention, the second dielectric film is formed by dielectric material by which a mobility of the electric charge existing at the surface of the second dielectric film depends on the polarity of the electric charge when the voltage is applied between the first and the second electrodes, so that the electric charge of the second dielectric film surface is movable comparatively easily to the first dielectric film by the electric field between electrodes.

Besides, to achieve the above objects, the light diffraction modulation element of the present invention includes a common electrode, a plurality of first electrodes oppositely arranged to the common electrode, a common dielectric film formed at one side of the first electrode opposed to the common electrode and a first dielectric film formed at one side of the first electrodes opposed to the common electrode, one of the adjoining first electrodes being displaced or deformed in a direction perpendicular to the common electrode when a voltage between one of the adjoining first electrodes and the common electrodes is applied, not making an incident light striked another side of a plurality of first electrodes an odd degree diffraction light at a first status, and making an odd degree diffraction light according to a difference in a level at a second state and the common dielectric film including dielectric material of which mobility showing a degree of movement of an electric charge depends on a polarity of the electric charge, the electric charge existing at a surface of the common dielectric film, being aparted from there and moved by an electric field between the first electrode and the common electrode.

According to the light diffraction modulation element of the present invention, the second dielectric film is formed by dielectric material by which a movement degree of the electric charge for existing at the surface of the second dielectric film depends on a polarity of the electric charge when the voltage is applied between the one adjoining first electrode and the common electrode, so that the electric charge of the second dielectric film surface is movable comparatively easily to the first dielectric film by the electric field between electrodes.

Besides, to achieve the above objects, the image display device irradiates a light diffraction modulation element with irradiation light from a light source to display an emitted light from the light diffraction modulation element at a display means to thereby form image, and the light diffraction modulation element includes a common electrode, a plurality of first electrodes oppositely arranged to the common electrode, a common dielectric film formed at one side of the first electrode opposed to the common electrode and a first dielectric film formed at one side of the common electrode opposed to said first electrode, one of the adjoining first electrodes being displaced or deformed in a direction perpendicular to the common electrode when a voltage between one of adjoining the first electrodes and the common electrode is applied, not making an incident light striked another side of a plurality of the first electrodes an odd degree diffraction light at a first status, and making an odd degree diffraction light according to a difference in a level at a second status, and the common dielectric film including dielectric material of which a mobility showing a degree of movement of an electric charge depends on a polarity of the electric charge, the electric charge existing at the surface of the common dielectric film, being aparted from there and moved by an electric field between the first electrode and the common electrode depends on a polarity of the electric charge.

According to the image display device of the present invention, the second dielectric film is formed by dielectric material by which a mobility of the electric charge existing at the surface of the second dielectric film depends on a polarity of the electric charge when the voltage is applied between the one of adjoining first electrode and the common electrode, so that the electric charge of the second dielectric film surface is movable comparatively easily to the first dielectric film by the electric field between electrodes.

BRIEF DESCRIPTION OF THE DRAWINGS

The above and other objects and features of the present invention will be described in more detail, with reference to the accompanying drawings, in which.

DESCRIPTION OF THE PREFERRED EMBODIMENTS

Hereinafter, an embodiment of the present invention will be described with reference to the accompanying drawings.

Figure 1:
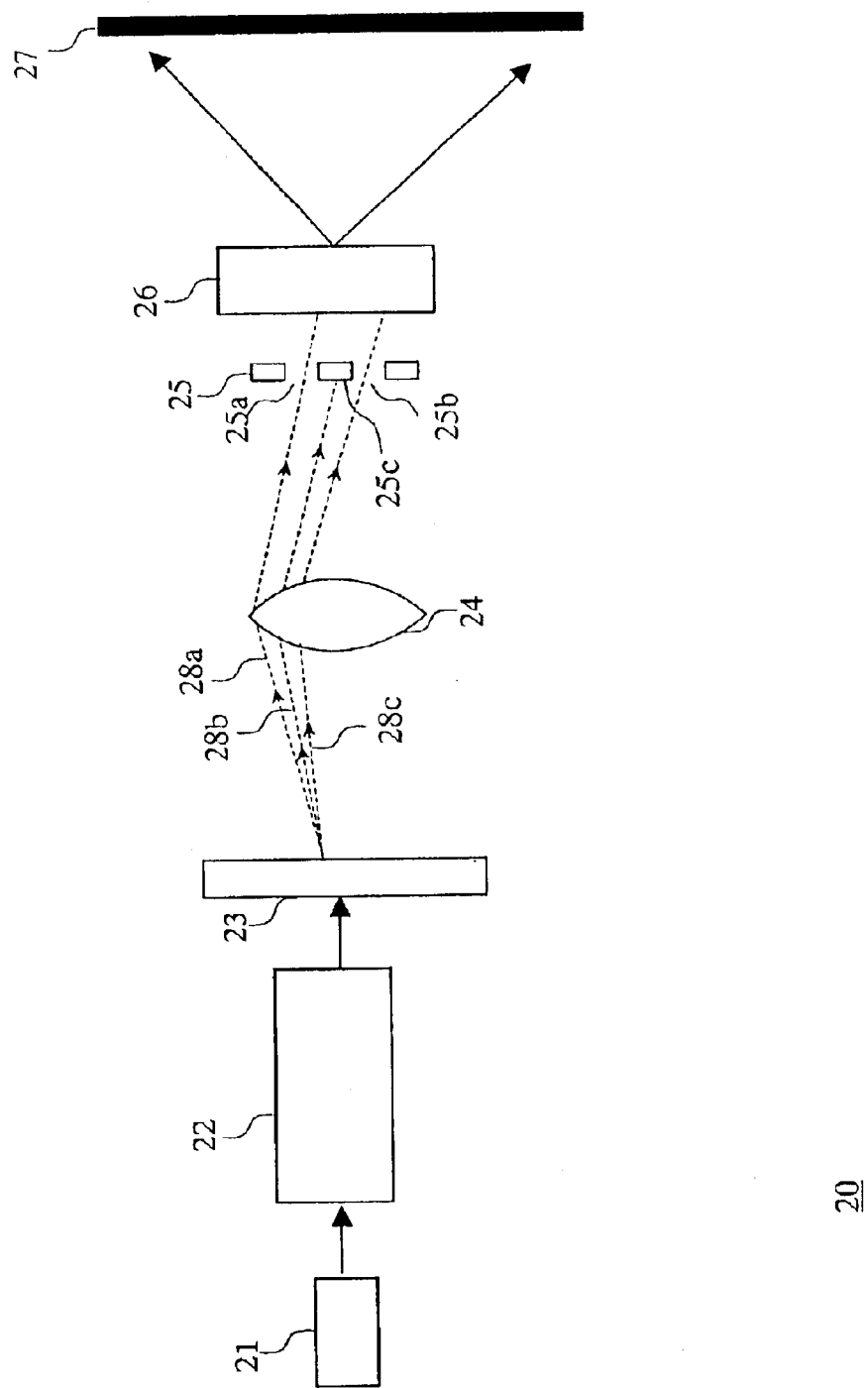
FIG. 1 is a schematic view showing an example of a configuration of an image display device according to an embodiment of the present invention.

FIG. 1 is a schematic view showing an example of a configuration of an image display device of the present embodiment.

The image display device 20 as shown in FIG. 1 is composed of a light source 21, a light optical system 22, a one-dimensional display element GLV element 23, a lens 24, a space filter 25, a scanning mirror 26 and a screen 27.

The light source 21 is a device like a semiconductor leaser for example and including a plurality of light sources for emitting luminous fluxes of red, green and blue which are the three primary colors.

The light optical system 22 converts a light beam from the light source 21 into parallel light to irradiate at the one-dimensional display element GLV element 23.

On the one-dimensional display element GLV element 23, 1080 pixels are arranged to one-dimensional for example. The one-dimensional display element GLV element 23 applies a drive voltage corresponding to a displayed image to perform an ON state or an OFF state, and reflects or diffracts a striked illumination light to emit reflection light or diffraction light to thereby control a tone of a emitted light. In the following, the one-dimensional display element GLV element 23 is called a GLV element or a GLV 23.

In the present embodiment, the GLV element 23 emits to +/−1 degree diffraction light 28a and 28c by diffraction effect and emitted in the respective different direction to zero degree light 28b.

The lens 24 magnifies an image of a one-dimensional formed by the reflection light 28b or diffraction lights 28a and 28c emitted from GLV element 23 to project into the scanning mirror 26.

The 0 degree light 28b, +/−one degree light 28a and 28c emitted by the GLV element 23 is magnified by the lens 24 and strikes at the space filter 25.

The space filter 25 lets +/−1 degree light 28a and 28c emitted from the lens 24 pass though and reach the scanning mirror 26. Besides, the space filter 25 shields the reflection light or zero degree light 28b emitted from the lens 24.

The scan mirror 26 is scanning a reflection light including an image information of a one-dimensional from the GLV element 23 to reflect on the scanning mirror 27 to thereby project an image of a two-dimensional on the screen 27. The scanning mirror 26 is a galvano mirror for example.

Figure 2:
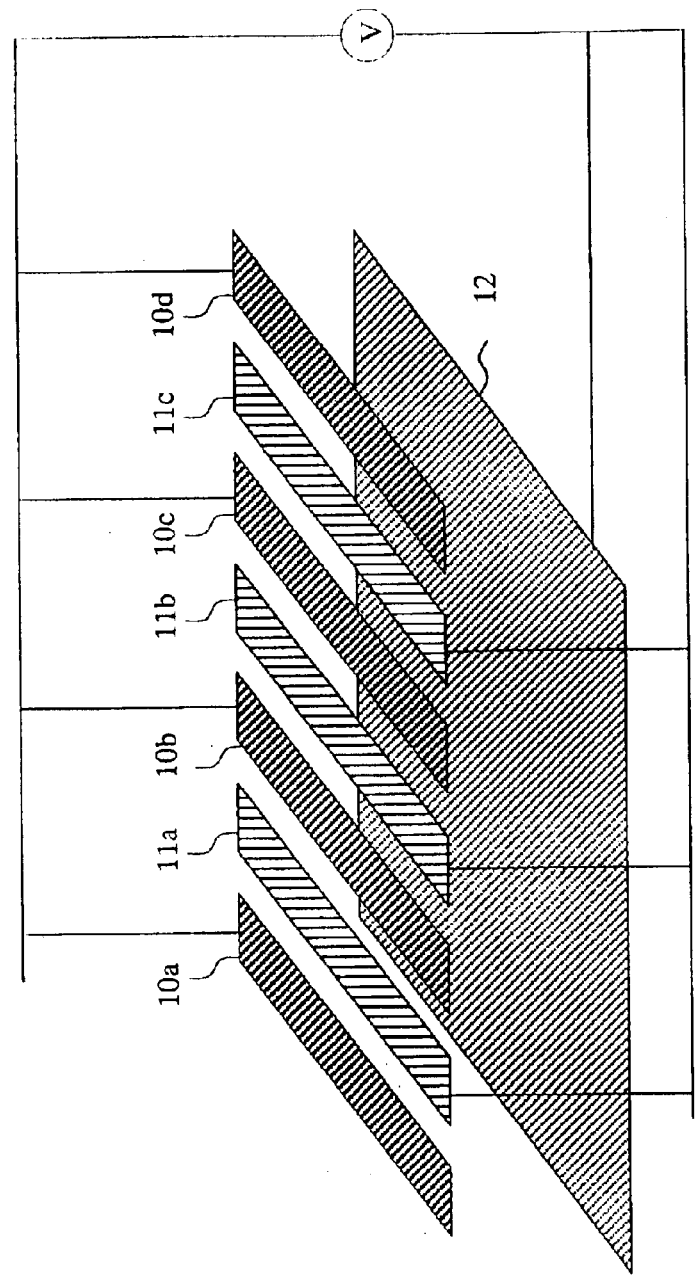
FIG. 2 is a schematic perspective view showing an example of a structure of a light diffraction modulation element according to an embodiment of the present invention.

FIG. 2 is a perspective view showing a configuration of the GLV element 23 using the image display device 20 according to the present embodiment.

As shown in FIG. 2, in the GLV element 23, for example strip-shaped first electrodes (ribbons) 10a, 11a, 10b, 11b, 10c, 11c, 10d are arranged on a second electrode 12 consisted of polysilicon, for example, keeping predetermined intervals with the second electrode 12, and a upper side of them works as a reflection side.

In FIG. 2, the dielectric films formed at a upper side of the second electrode 12 and the respective bottom sides of the first electrodes 10a, 11a, 10b, 11b, 10c, 11c, 10d are not described. Besides, a shape of the first electrode is not limited as described above. Still, the second electrode is also called a common electrode in the following.

The first electrodes 10a, 10b, 10c, 10d can be displaced in a direction perpendicular to the common electrode 12 according to a drive voltage and change a distance to the reflection sides of the top portion of them from the common electrode. On the other hand, the first electrodes 11a, 11b, 11c are not displaced and a height of the reflection sides of them is unchanging.

Note that, the first electrodes 10a, 10b, 10c, 10d able to displace are called movable electrodes, and the first electrodes 11a, 11b, 11c not able to displace are called fixed electrodes.

As an example of a representative size of the first electrode, for example, a width is 3 to 4 μm, a length is 200 to 400 μm and a gap between adjoining the first electrodes is around 0.6 μm. However, it is not limited to the shape described above.

A plurality of the first electrodes can be used a single pixel as a single set. For example, adjoining six first electrodes 10a, 11a, 10b, 11b, 10c, 11c, 10d as shown in FIG. 2 can display a single pixel as a single set. In this case, the width for a pixel is around 25 μm.

For example, in the GLV displaying 1080 pixels which have been practically used, the first electrodes for 1080 pixels are arranged along with a lateral direction in FIG. 2.

Figure 3:
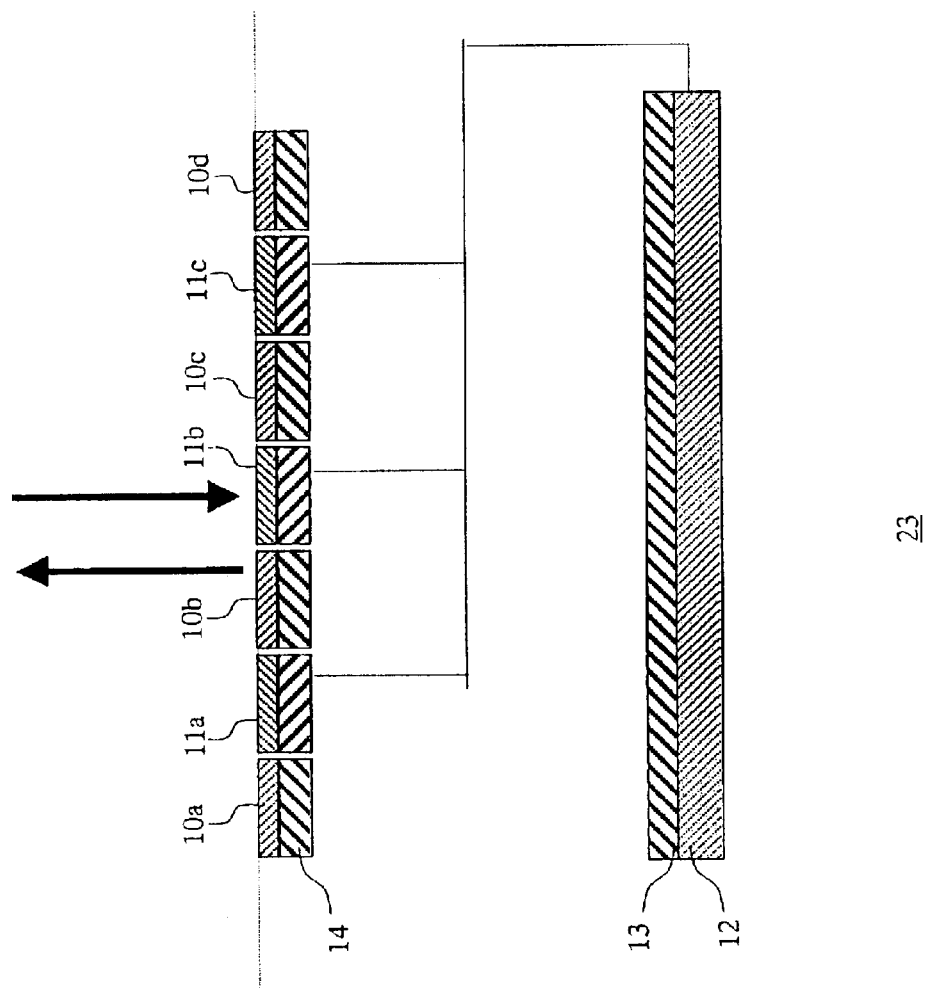
FIG. 3 is a schematic cross-sectional view showing a operation of a light diffraction modulation element according to an embodiment of the present invention.

An operation of the GLV element 23 is controlled by an ON/OFF of a drive voltage applied between the first electrodes 10a, 11a, 10b, 11b, 10c, 11c, 10d and the common electrode 12. FIG. 3 is a cross-sectional view of a lateral direction of the GLV element 23 as shown in FIG. 2. The movable electrodes 10a, 10b, 10c, 10d does not apply for a voltage, and electrical potentials for the first electrodes and the common electrode are same. Namely, the GLV element 23 is in an OFF state. The OFF state is a first status. The fixed electrodes 11a, 11b, 11c are connected with the common electrode 12 to keep always same electrical potential.

Further, a second dielectric film 13 consisted of silicon oxide for example is formed at the upper side of the common electrode 12, that is, the side opposed to the first electrode. Besides, a first dielectric films 14 consisted of silicon nitride for example are formed at the lower sides of the respective first electrodes 10a, 11a, 10b, 11b, 10c, 11c, 10d, that is, the sides opposed to the common electrode.

A drive voltage is not applied for the movable electrodes 10a, 10b, 10c, 10d, so that the movable electrodes 10a, 10b, 10c, 10d are not displaced and the entire first electrodes keeps a certain distance from the common electrode 12 to arrange substantially same plane.

When illumination light strikes in this state, reflection luminous flux reflected at a plurality of the first electrodes is not an optical-path difference but only diffraction light of which period is an interval arranged of the first electrodes. The diffracted light is shielded at both ends of the filter 25 with entire because of diffracting wide angle compared with apertures 25a, 15b of the space filter 25 as shown in FIG. 1.

Figure 4:
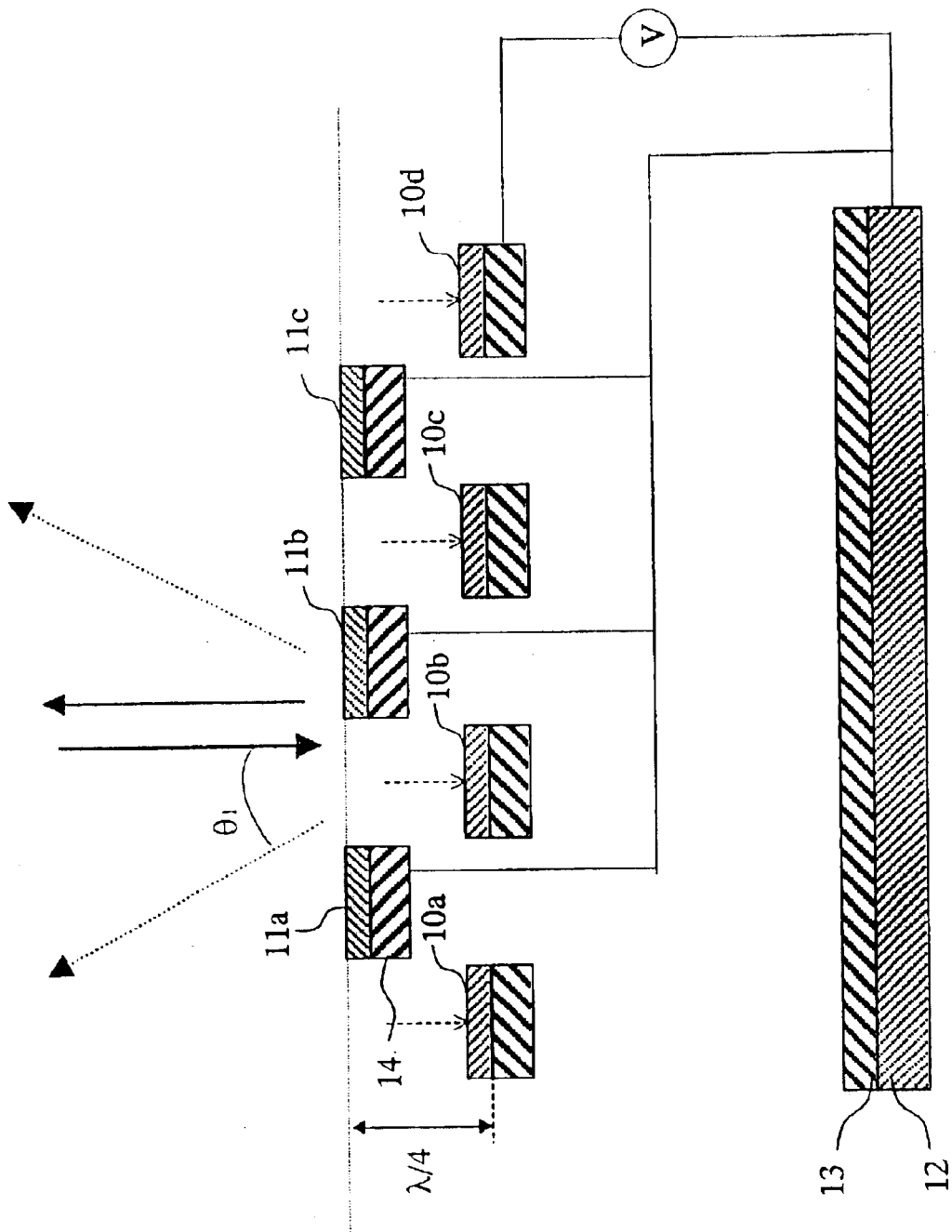
FIG. 4 is a schematic cross-sectional view showing an operation of a light diffraction modulation element according to an embodiment of the present invention.

In FIG. 4, the predetermined drive voltage are applied for the movable electrodes 10a, 10b, 10c, 10d, and the fixed electrodes 11a, 11b, 11c are connected with the common electrode 12. Therefore, the movable electrodes have a potential difference and the fixed electrodes have the same electrical potential with the common electrode in the first electrode.

As shown in FIG. 4, the movable electrodes 10a, 10b, 10c, 10d applying the drive voltage are lowered to the common electrode 12 side by the electrostatic force. For example, the movable electrodes 10a, 10b, 10c, 10d are lowered at $\lambda/4$ $\lambda$ is a wavelength of an incident light. As an example, in the case of $\lambda=532$ nm, the movement amount of the movable electrodes is λ/4=133 nm. Namely, the GLV element 23 is in an ON state, that is a second status.

When the illumination luminous flux strikes in this state, the entire optical-path different between the luminous flux reflected at the movable electrodes 10a, 10b, 10c, 10d and the luminous flux reflected at the fixed electrodes 11a, 11b, 11c is a half-wavelength (λ/2). Therefore, the GLV element 23 performs as a reflection type diffraction grating, so that the reflection luminous flux (0 degree light) interferes each other to make a diffraction light of an odd degree like +/−1 degree light and +/−3 degree light.

The diffraction light of the respective degree is diffracted in an angle direction decided by a wavelength of the illumination luminous flux and a pitch of the GLV element 23, so the diffraction light luminous flux like 0 degree light and +/−1 degree light proceeds to the respective difference direction to strike a reflection portion 25c and the aperture 25a, 25b of the space filter 25 as shown in FIG. 1 to thereby pass though +/−1 degree diffraction light to the aperture 25a, 25b.

According to the electrostatic machine element composed of the respective movable electrodes and the common electrode for corresponding to the movable electrodes, a position of the movable electrodes returns gradually to a base position with the elapse of time by the electrostatic shielded effect between the movable electrodes and the common electrode, that is the charging phenomenon.

In the present embodiment, for preventing from the charging phenomenon, a material having an asymmetry property to an electric charge carrying at the dielectric film is used as the dielectric films provided for the respective movable electrodes and the common electrode. Then, as an example for applying the present embodiment to the GLV element 23, a drive voltage is applied so that the movable electrode opened has a low electric potential and the common electrode has a high electric potential, accordingly an electric charge is not accumulated at the movable electrode. Therefore, it becomes possible to control the electrostatic shield effect. Here, in the present embodiment, the electrostatic machine element is composed of the respective movable electrode and the corresponding common electrode, the voltage is applied between the movable electrode and the common electrode to displace or deform the movable electrode by the electrostatic force. And, the light diffraction modulation element is including the electrostatic elements as described above, the movable electrodes are displaced or deformed by applying a voltage between the movable electrodes and the common electrode to form a diffraction grating by the movable electrode and the fixed electrode to thereby modulate striked light. Further, an image display device is including the light diffraction modulation element as described above, modulating striked light at the light diffraction modulation element to display selectivity the predetermined diffraction light.

Figure 5:
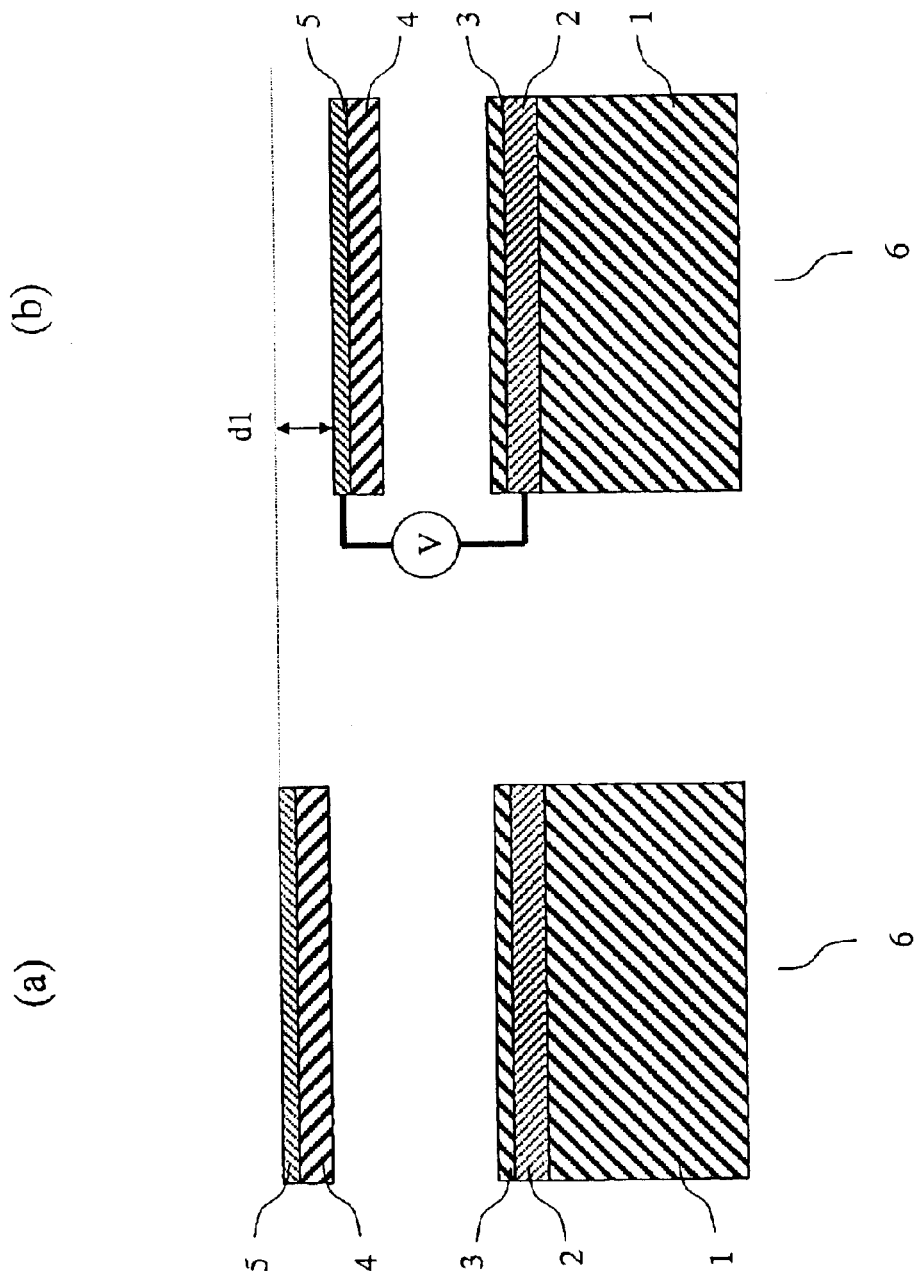
FIGS. 5(a) and 5(b) are schematic cross-sectional views showing an operation of an electrostatic machine element according to an embodiment of the present invention.

FIGS. 5(a) and (b) are views explaining a structure and an operation of the electrostatic machine element according to the present embodiment.

As shown in FIG. 5(a), an electrostatic machine element 6 is formed by a second electrode 2 as a lower structure on a substrate 1 of silicon or glass for example, and a second dielectric film 3 for protecting the second electrode 2 on the second electrode 2. Here, the second electrode 2 is composed of an electrical material like polysilicon and the second dielectric film 3 is composed of silicon oxide ($SiO_2$) for example. And, it has comprises a first dielectric film 4 consisted of silicon nitride (SiN) and a first electrode 5 consisted of aluminum as an upper structure.

As shown in FIG. 5(b), a drive voltage is applied to make the first electrode 5 a low electric potential and the second electrode 2 a high electric potential. It is called as an ON state. Then, an electrostatic force (Coulomb force) is caused between the first electrode 5 and the second electrode 2, as a result the first electrode 5 is mechanically displaced or deformed to the second electrode 102 side. The amount of displacement or deformation (warp) (the movement amount) $d_1$ depends on a value of a drive voltage. In the GLV element, a reflection type diffraction grating is formed by the movement amount $d_1$ or the warp between the fixed electrode and the movable electrode to modulate striked light to diffraction light.

Note that, the state where a drive voltage is not applied as shown in FIG. 5(a) is called as an OFF state. In the OFF state, an upper side of the movable electrode and the fixed electrode forms a reflection surface to reflect incident light, for example.

The influence of the electrostatic shield effect between the first electrode 5 and the second electrode 2 of the electrostatic machine element 6 for operating the above described will be mentioned.

Figure 6:
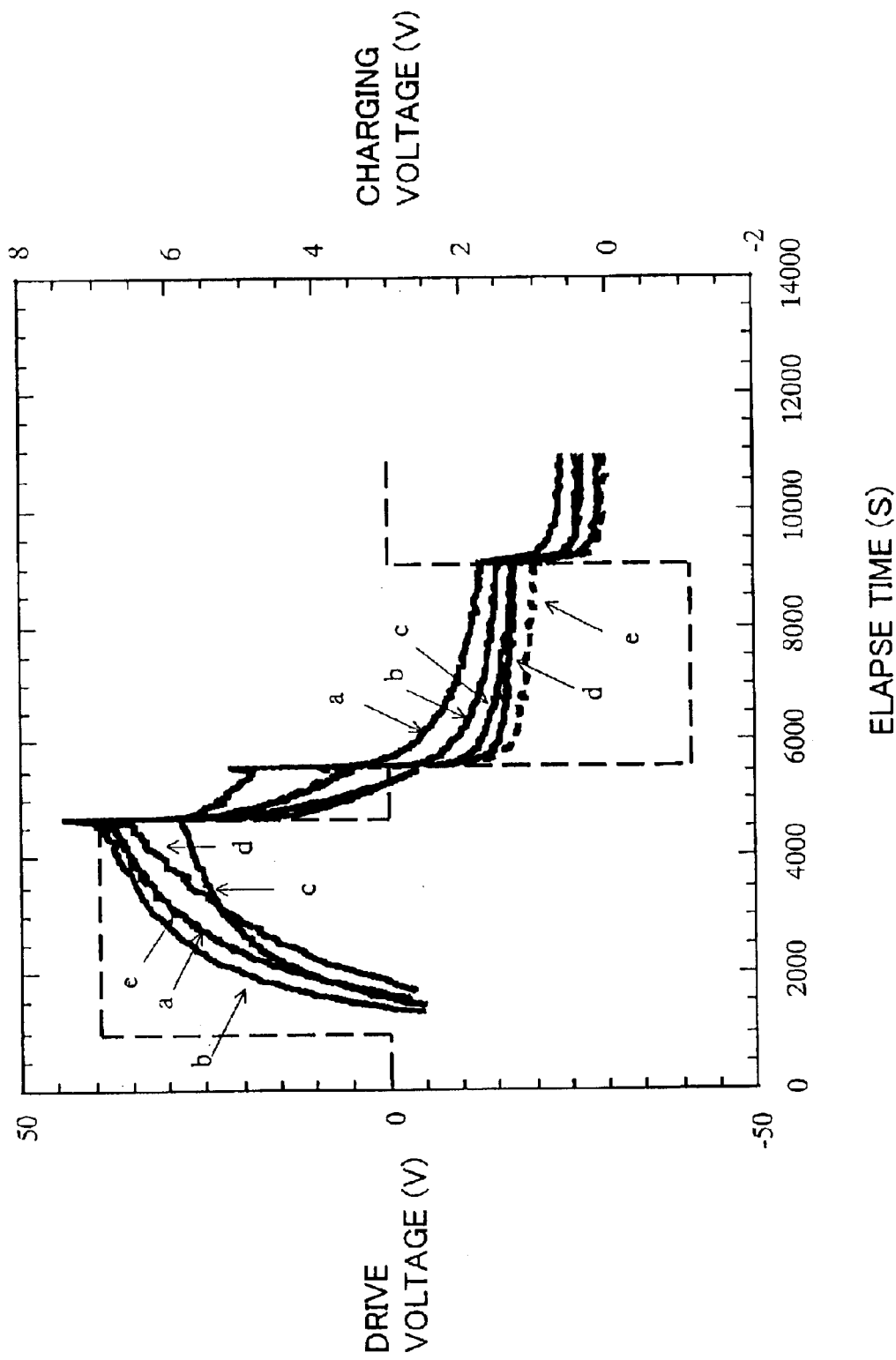
FIG. 6 is a graph showing a change of a charging voltage following a change of a drive voltage in an electrostatic machine element according to an embodiment of the present invention.
Figure 12:
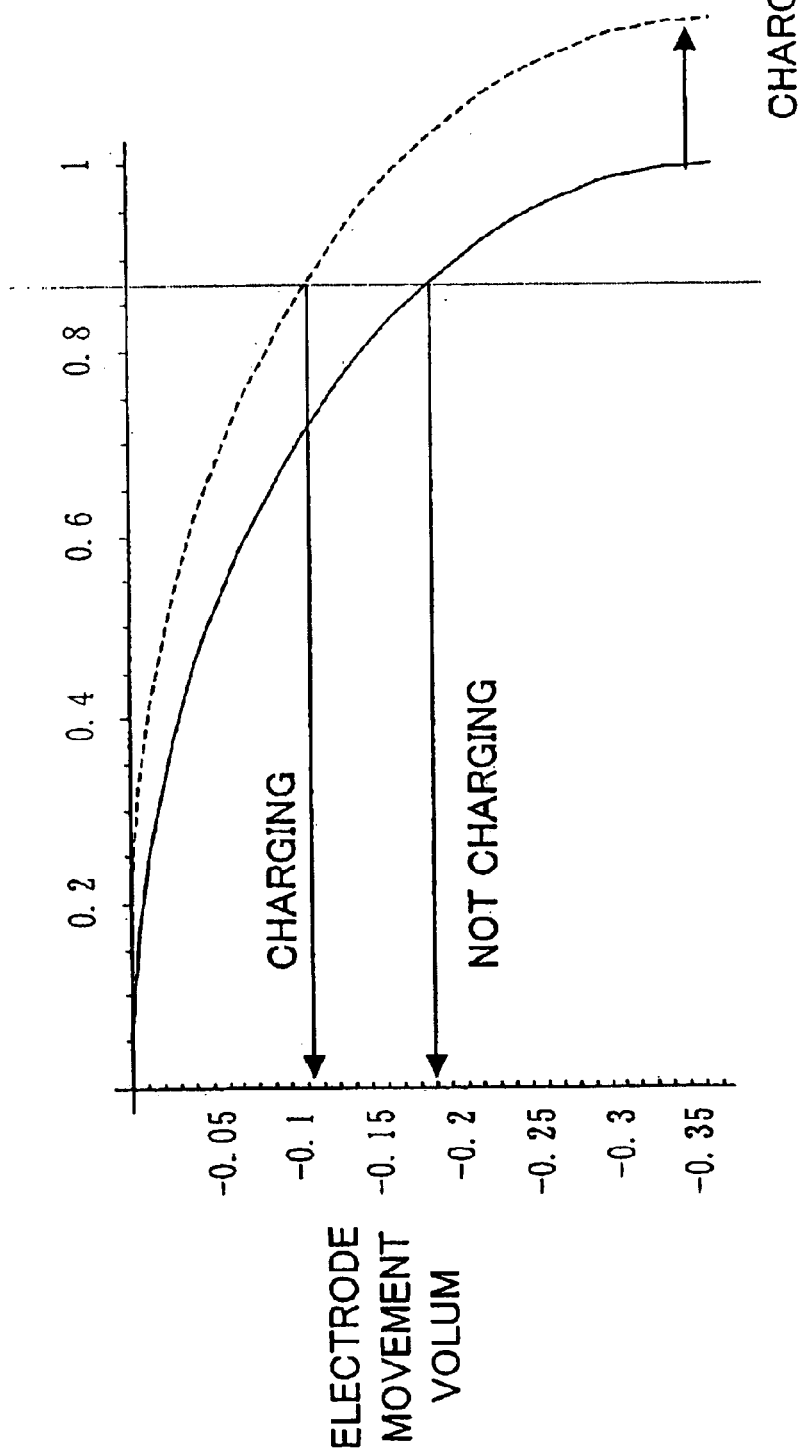
FIG. 12 is a graph describing a change of operation amount of electrode by a charging phenomenon in an electrostatic machine element according to an prior art.
Figure 13:
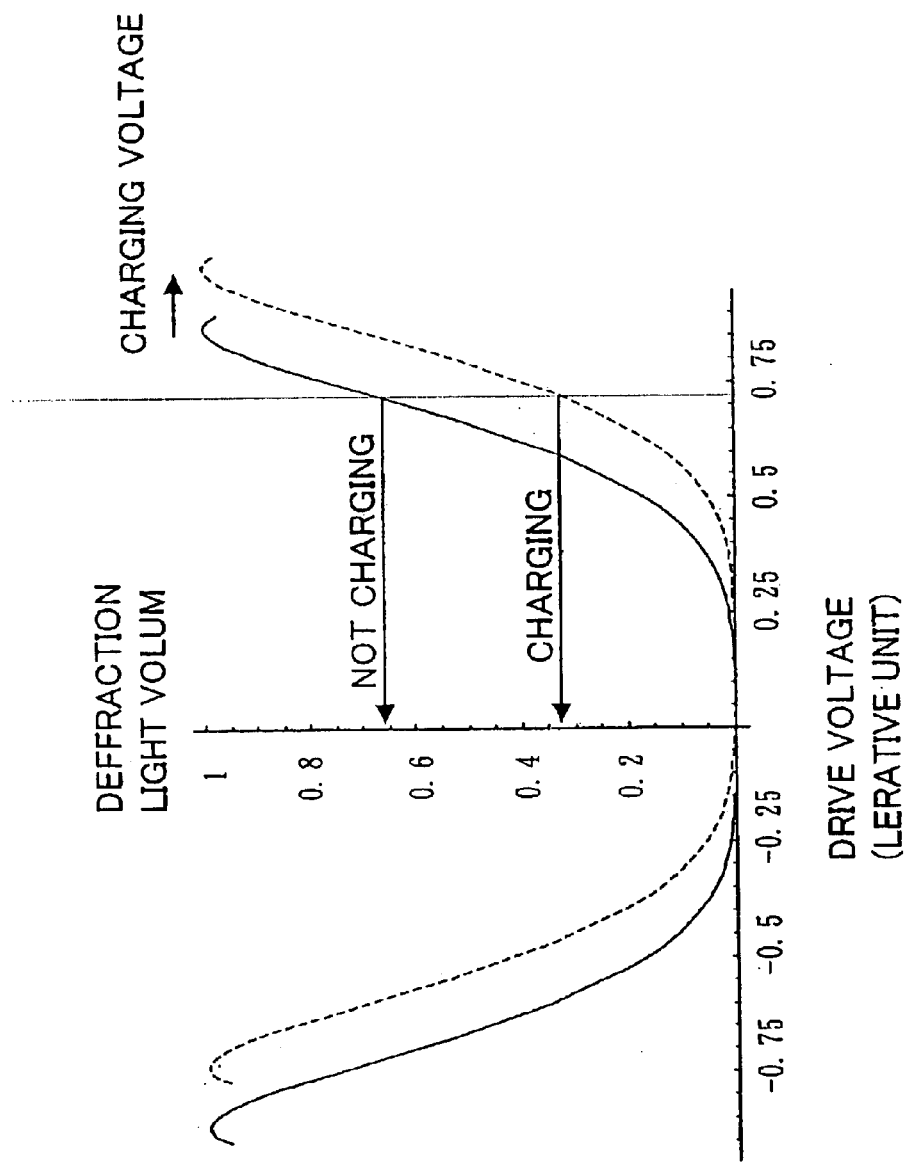
FIG. 13 is a graph describing a change of operation amount of electrode by a charging phenomenon in an electrostatic machine element according to a prior art.

FIG. 6 is a graph showing a charging voltage corresponding to a change of a drive voltage. Specifically, a change of the charging voltage (a, b, c, d, e) is shown when a polarity of the drive voltage (a broken line) applied between the first electrode 5 and the second electrode 2 is changed with the elapse of time. Besides, the charging voltage is defined as a difference between the drive voltages needed when the charging occurs and the drive voltage needed when the charging does not occur, similarly defined in FIG. 12 and FIG. 13.

The x-axis shows a time axis and a unit is a second in FIG. 6. The y-axis on left side shows a value of a drive voltage, the y-axis on right side shows a value of the charging voltage and a unit is V. In the drive voltage shown in the y-axis, a positive voltage shows that the voltage is applied to make a high electrical potential the first electrode and a low electrical potential the second electrode, and a negative voltage shows that the voltage is applied to make the first electrode a low electrical potential and the second electrode a high electrical potential.

As shown in FIG. 6, at first, when the drive voltage is increased from 0 V to +40 V, the charging voltage for example showing at measurement result e is gradually increasing with the elapse of time to increase until around 7 V after 3500 seconds. This is a similar result in the case of the GLV element described as shown in FIG. 10 to FIG. 13. The charging voltage around 7 V influences the position on the first electrode as described above and a amount of diffraction light extremely fluctuates. The strength of brightness of light fluctuates maximum 40% on the display picture of an image display device using the GLV element as described above.

And, when the drive voltage is decreased from +40 V to 0 V once, further, decreased until −40 V, the charging voltage is decreased, quickly. The charging voltage is quickly decreased just after the negative drive voltage is applied and stable in short term, and dependence of time is decreased. In the case of the measurement result e, the stable value of the charging voltage is around 1 V and extremely small compared with 7 V in the case of the positive drive voltage. Therefore, in the ON state of the diffraction modulation element, displacing of the first electrode (the charging phenomenon) is lowered and a change of diffraction light amount is extremely lowered. As a result, a change of strength of a brightness of light on a display picture can be controlled to extremely small level.

Next, when 0 V is applied for the drive voltage, so that the OFF state is obtained, the charging voltage is also lowered to 0 V.

The measurement results a, b, c, d are showing similar tendency. And, a lot of measurements show the same tendency.

Figure 7:
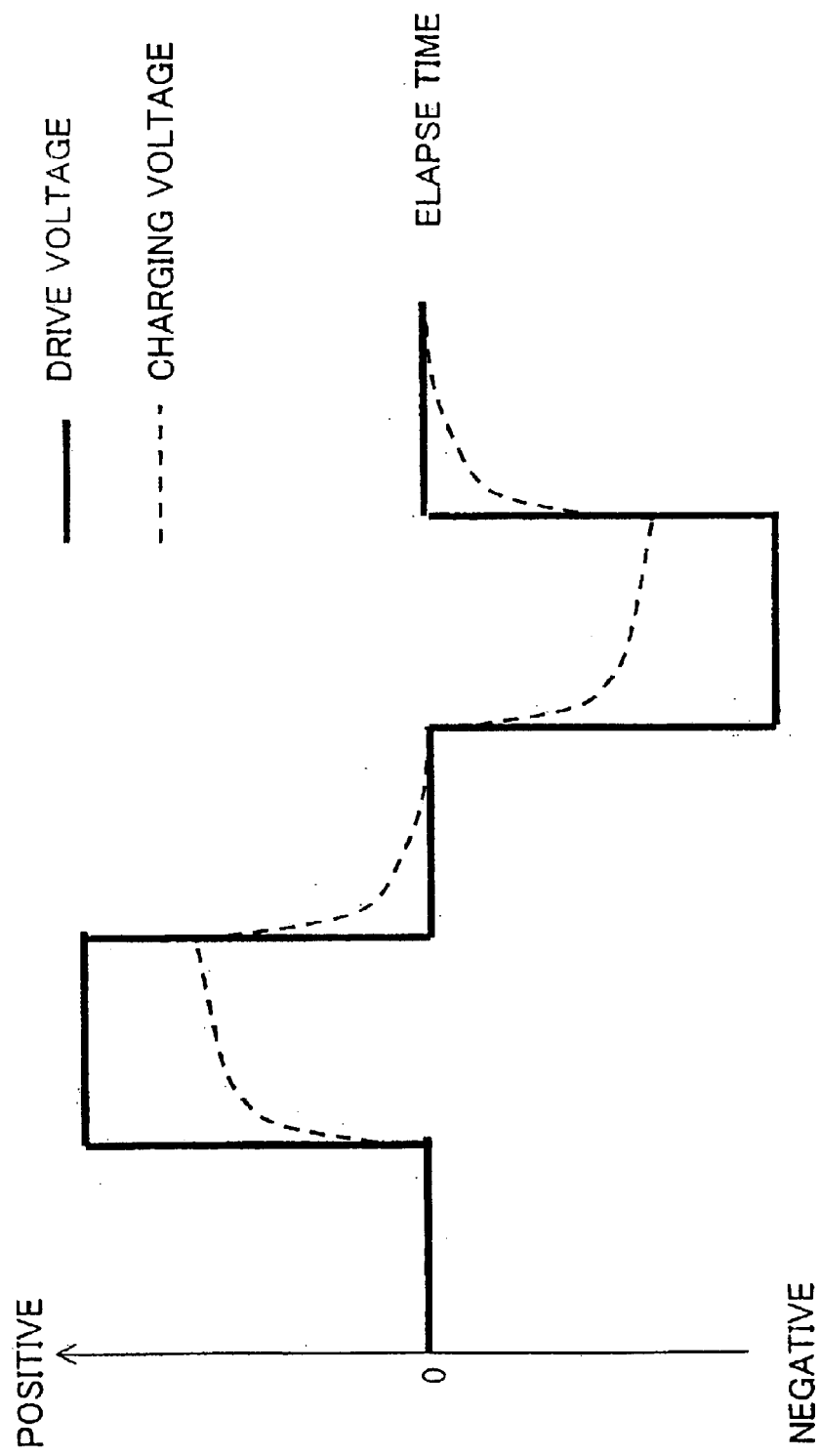
FIG. 7 is a graph showing a change of a charging voltage following a change of a drive voltage in an electrostatic machine element according to the prior art.

FIG. 7 is a graph showing a relation between a drive voltage and a charging voltage.

An x-axis shows a time axis and a y-axis shows a drive voltage or a charging voltage in FIG. 7. A definition of a positive voltage and a negative voltage is similar with FIG. 6.

As shown in FIG. 7, the respective positive and negative drive voltages generate large charging voltages.

However, a measurement technology of the charging voltage has not been fully established.

In the present embodiment, the GLV element is driven by a larger voltage than an actual drive voltage (around 20 V) to succeed in measuring precisely a remarkable change of the charging voltage in a relatively short term (several hours) by an advanced measurement technology at high temperature environment to thereby obtain measurement results with high repeatability.

In the case where measuring process in the present embodiment as described above is not taken, an extremely long measurement time is needed until appearing a remarkable change of the charging voltage, so it is considered that precisely measuring is extremely difficult in ordinal conditions.

And, an operation of the electrostatic machine element will be described based on the measurement result in FIG. 6.

Figure 8:
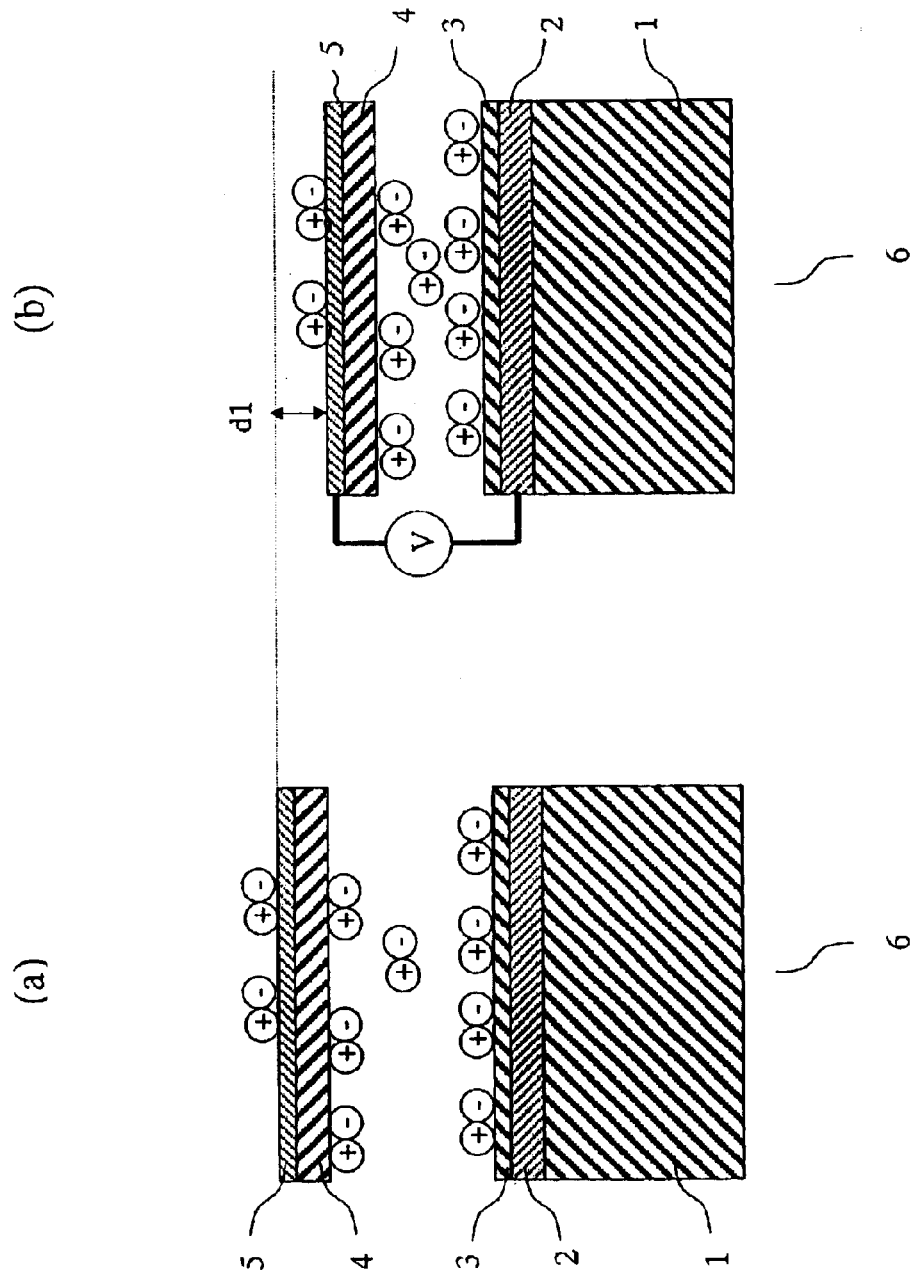
FIGS. 8(a) and 8(b) are schematic cross-sectional views showing a principle of an operation of an electrostatic machine element according to an embodiment of the present invention.

FIGS. 8(a) and (b) are views describing an operation of the electrostatic machine element 6 as above mentioned.

As shown in FIG. 8(a), in an environment of high vacuum, molecules for example moisture existing in low density is adhering at the dielectric films 3 and 4. As shown in FIG. 8(a) shows an OFF state of the electrostatic machine element 6.

As shown in FIG. 8(b), the drive voltage is applied for around 20 V to make the first electrode 5 a low electrical potential and the second electrode 2 a high electrical potential in time $T_0$ to make the electrostatic element 6 the ON state. Therefore, the first electrode 5 is mechanically displaced or deformed to the second electrode 2 side and a warp or a movement amount $d_1$ is corresponding to a value of the drive voltage.

The distance between the dielectric films 3 and 4 is around 1 μm, so a high electric field is formed at around $2\times10^5$ V/cm between the first electrode 5 and the second electrode 2.

Figure 9:
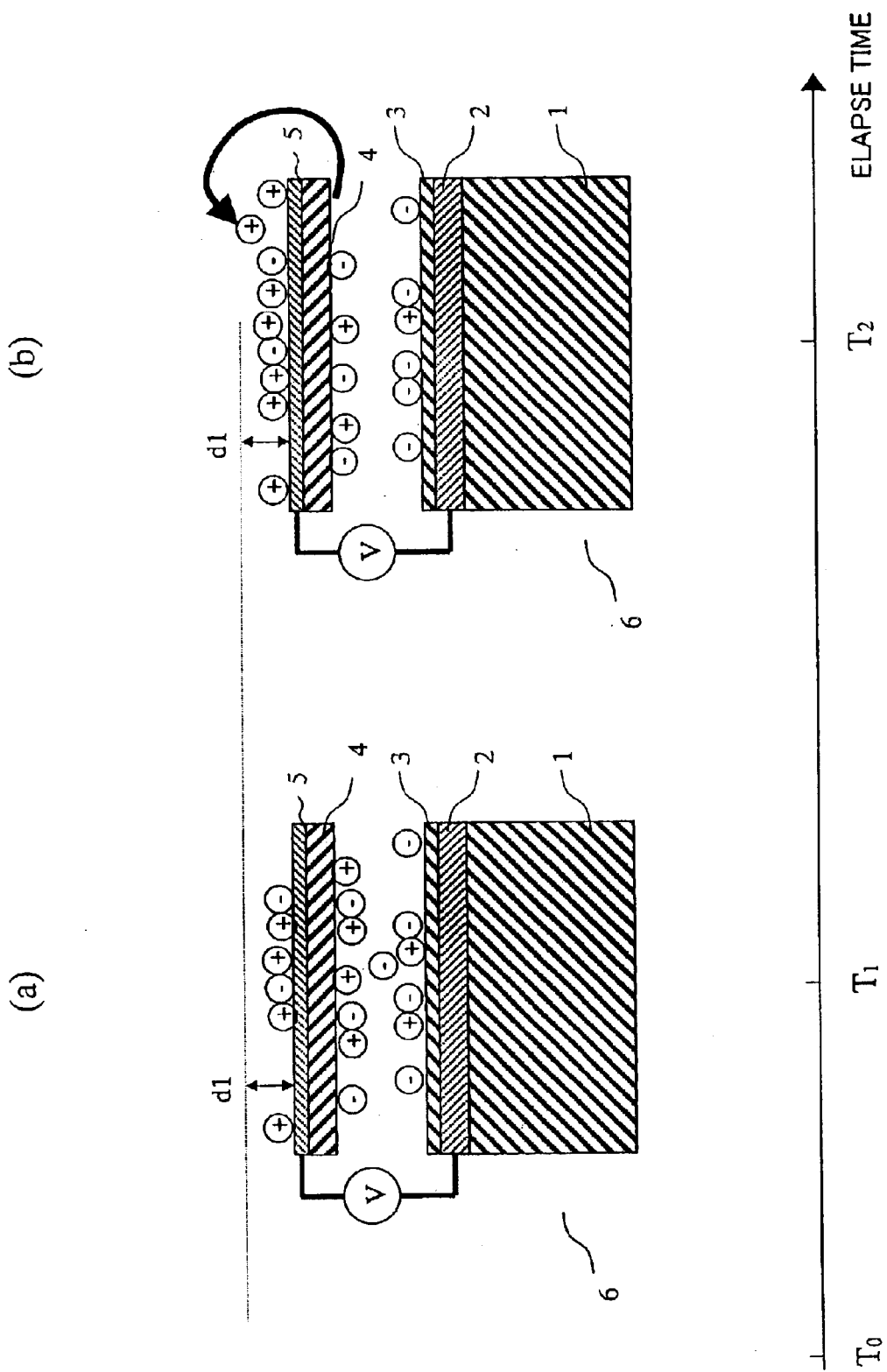
FIGS. 9(a) and 9(b) are schematic cross-sectional views showing a principle of an operation of an electrostatic machine element according to an embodiment of the present invention following in FIGS. 8(a) and 8(b)
Figure 10:
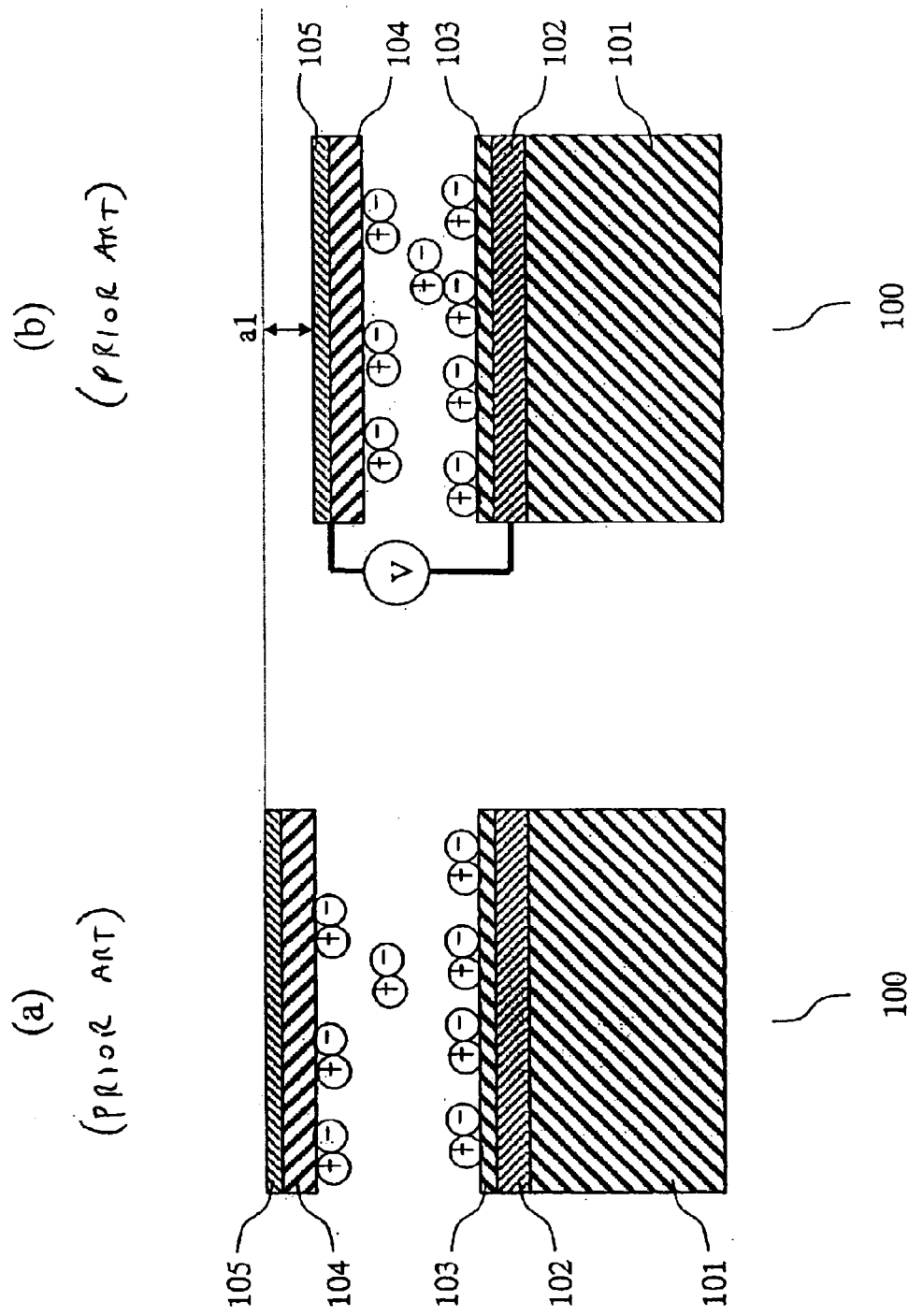
FIGS. 10(a) and 10(b) are schematic cross-sectional views showing an operation of an electrostatic machine element according to a prior art.
Figure 11:
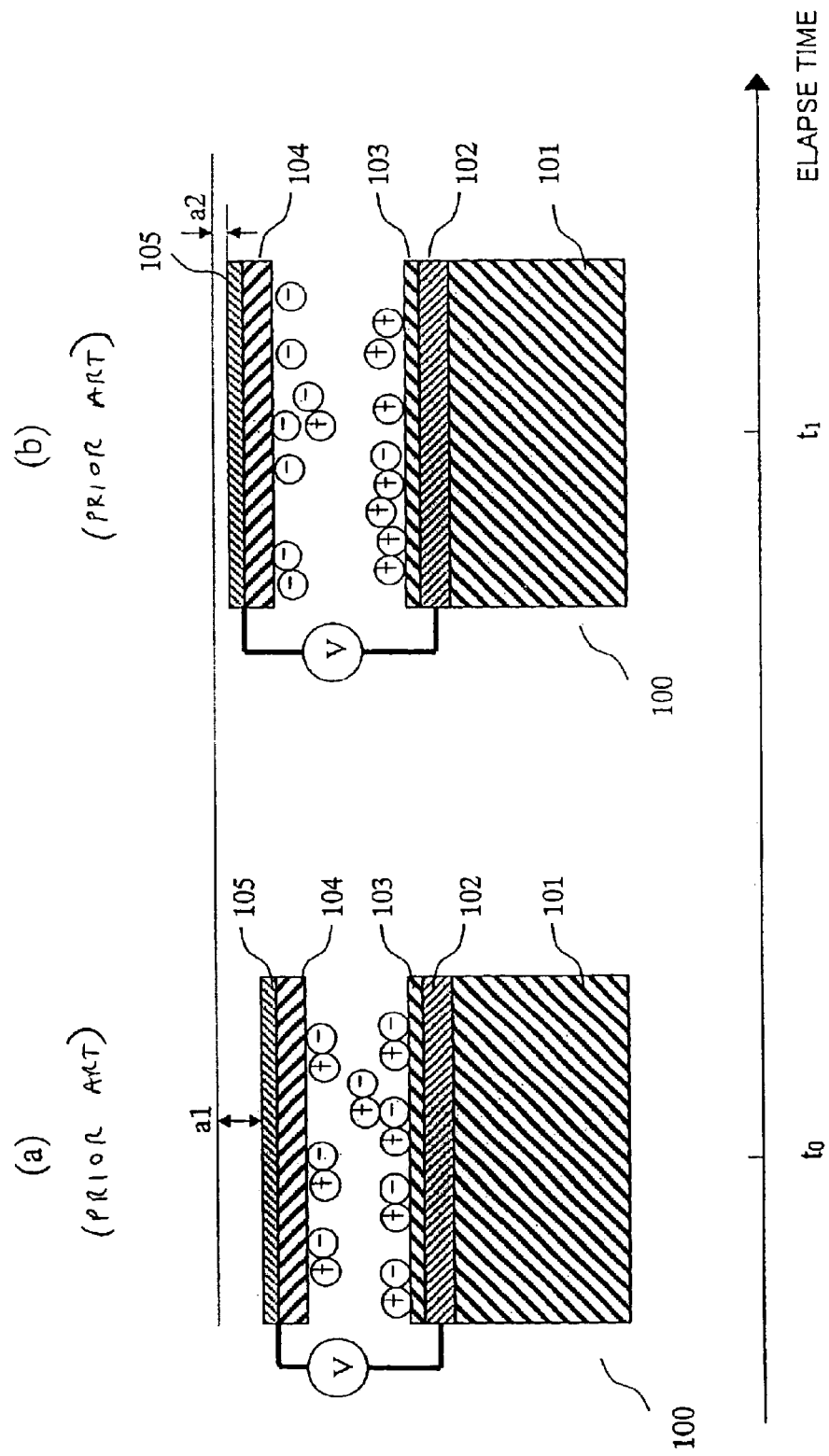
FIGS. 11(a) and 11(b) are schematic cross-sectional views describing a charging phenomenon in an electrostatic machine element according to a prior art.

The molecules ionizing steadily in a normal temperature like $H_2O$ molecules repeats ionization and bonding steadily at a time $T_1$ as shown in FIG. 9(a) to keep equilibrium to thereby make a portion of the molecules charged particles (ions) adhering at the surface of the dielectric films 3 and 4.

Those charged particles are restrained by adhesion force of the dielectric films 3 and 4. In the present embodiment, the second dielectric film 3 uses a material of which the mobility of the charged particles depends on the polarity of the electric charges of the charged particles. Therefore, the ions adhering with the second dielectric film 3 are aparted from the second dielectric film 3 with relatively short time by a high electric field between the first electrode 5 and the second electrode 2 to move between the dielectric films 3 and 4 along in a direction to the electrical field.

Specifically, since the voltage is applied to make the first electrode a low electrical potential and the second. electrode a high electrical potential, negative charges adhering at the first dielectric film 4 formed at the first electrode 5 moves to the second dielectric film 3 formed at the second electrode 2 and positive charges adhering at the second dielectric film 3 moves to the first dielectric film 4.

For example, when adhesions are moisture ions, the mobility of a particle $H_3O^+$ having a positive charge is extremely higher than that of a particle $OH^-$ having a negative charge. Therefore, a hydrophilic dielectric such as silicon oxide and silicon nitride is effective as a material of the second dielectric film 3. Here, a silicon oxide film is used for example.

Besides, while the second electrode 2 is formed on the substrate 1 and the lower surface of the second electrode 2 is covered with the substrate 1, an edge and an upper surface of the first electrode 5 are opened. Therefore, ions can move from the first electrode 4 to the first dielectric film 5 by the high electrical field between the electrodes. As a result, an ion that moved from the surface of the second dielectric film 3 reaches the first dielectric film 4 to move from the first dielectric film 4 to the first electrode 5 via the edge of the first dielectric film 4 by the high electrical field between electrodes to thereby be accumulated at the upper side of the first electrode 5.

As a result, the electric charge adhered with the second dielectric film 3 at the high electrical potential is mainly negative charge and the electric charge adhered with the first dielectric film 4 is fewer positive charge and negative charge. Therefore, the electrical field formed between the first electrode 5 and the second electrode 2 is so weak by these adhesions electric charge that is does not largely influence the electrical field formed by the drive voltage.

Besides, the positive charge is easily aparted from the second dielectric film 3 and moves, so the particle charged can relatively quickly achieve stability state.

Therefore, a remarkable electrostatic shielded effect or the charging phenomenon does not occur, the first electrode 5 is positioned at the distance $d_1$ and not displaced with elapse of time.

According to the electrostatic machine element in the present embodiment, a material in which the mobility of the charged particle depends on a polarity of the electric charge is used as a dielectric film formed on the second electrode and the drive voltage is applied such that an ion easy to move is moved at the surface of the first dielectric film from the second dielectric film formed on the second electrode. For example, in the dielectric film of the second electrode or the common electrode, the drive voltage is applied to make the second electrode or the common electrode a high electrical potential and a low electrical potential at an opposed to an electrode in the case of the high mobility against a positive charge. Specifically, in the GLV element, a hydrophilic dielectric film like a silicon oxide film is used and a low electrical potential is applied to make the first electrode a low electrical potential and the second electrode a high electrical potential in the case of adhering moisture molecules.

Therefore, a portion of the ion (charged particle) adhered at the surface of the second dielectric film is relatively easily aparted from the second dielectric film to move until the first dielectric film. The circumference (an edge and an upper side) of the first electrode is opened, so that the ion that arrived at the first electrode moves to the first electrode from the first dielectric film via the edge of the first dialectic film by a high electric field between electrodes to distribute over the upper side of the first electrode.

Therefore, a formation of the electrical field formed by the electric charge adhered at opposed dielectric films is restrained to restrain a remarkable electrostatic shielded effect to thereby lower a displacement of a position of the electrode.

Besides, charged particle relatively quickly achieves stability state, so that a state of the electrostatic machine element is not gradually displaced with elapse of time.

Although the present invention is described based on the preferred embodiment as above mentioned, the present invention is not limited to the embodiment mentioned above and may be changed as far as not the purport of the present invention strayed away.

The electrostatic machine element of the present invention is not limited to the light diffraction modulation element and can be applied for other micro machine devices.

Besides, in the case of changing a kind of the adhered charged particle, the polarity of the drive voltage can be changed in response to the mobility of the particle.

Each of ribbon elements, i.e., the first electrodes and the first dielectric films may be declined to have a blaze angle, i.e., may be blazed, to coverage (concentrate) the diffraction light emitted therefrom to either one direction of "+" or "−", so that the improvement of a dark level and the improvement of the efficiency of the availability of light can be achieved.

The shape of the GLV element in a state ON or OFF is not emitted to the specific mode as described above. Namely, in the present invention, the distance between the first electrode and the second electrode may be $n\times\lambda/4$, where n is odd number, in ON state, or $n\times\lambda/4$, where n is an even number including O, in OFF state.

The image display device and the light diffraction modulation element mentioned at the above embodiment are examples and a kind of the structures thereof can be changed.

According to the present invention, in the electrostatic machine element it is possible to restrain from a decrease of practical electrostatic force between the electrodes accompanying with movement of an electric charge within the electrodes to realize stability and operation repeatability of element behaves in any circumstances at a high template, a high pressure and under long term drive.

Besides, according to the light diffraction modulation element, it is possible to stabilize a light amount of diffraction light and operate with excellent repeatability by using the electrostatic machine element as above mentioned.

Moreover, according to the image display device, it is possible to stabilize a light amount of diffraction light and operate with excellent repeatability by using the light diffraction modulation element as above mentioned.

What is claim is:

1. An electrostatic machine element comprising:

a displaceable or deformable first electrode;

a second electrode oppositely arranged to said first electrode;

a first dielectric film formed at one side of said first electrode opposed to said second electrode; and a second dielectric film formed at one side of said second electrode opposed to said first electrode, said first electrode being displaced or deformed in a direction perpendicular to said second electrode when a voltage is applied between said first and second electrodes; and said second dielectric film including dielectric material of which a mobility showing a degree of movement of an electric charge depends on a polarity of said electric charge, the electric charge existing at a surface of said second dielectric film, being aparted from there and moved by an electric field between said first and second electrodes;

wherein an edge of said first dielectric film, an edge of said first electrode and another side of said first electrode are opened so that said electric charge existing at the surface of said first dielectric film is movable to said first electrode via the edge of said first dielectric film, due to an electric field between said first and second electrodes.

2. An electrostatic machine element as set forth in claim 1, wherein said first electrode is displaced or deformed in a direction perpendicular to said second electrode in response to an application voltage for forming an electric field by which an electric charge having a high mobility at the surface of said second dielectric film is moved from said second electrode to said first electrode.

3. An electrostatic machine element as set forth in claim 1, wherein said second dielectric film is formed by dielectric material having a hydrophilic boundary surface.

4. An electrostatic machine element as set forth in claim 3, wherein said second dielectric film is formed by a silicon dioxide film or a silicon nitride film.

5. A light diffraction modulation element comprising:

a common electrode;

a plurality of first electrodes oppositely arranged to said common electrode;

a common dielectric film formed at one side of said common electrode opposed to said first electrodes, and a first dielectric film formed at one side of said first electrodes opposed to said common electrode, one of said adjoining first electrodes being displaced or deformed in a direction perpendicular to said common electrode when a voltage between one of adjoining said first electrodes and said common electrodes is applied;

wherein an incident light strikes a plurality of the first electrodes to diffract light at a non-odd degree of diffraction light at a first status, and in a second status, incident light strikes a plurality of the first electrodes to diffract light at an odd degree of diffraction light; and said common dielectric film including dielectric material of which mobility showing a degree of movement of an electric charge depends on a polarity of the electric charge, the electric charge existing at a surface of said common dielectric film, being aparted from there and moved by an electric field between said first electrode and said common electrode.

6. A light diffraction modulation element as set forth in claim 5, wherein an edge of said first dielectric film, an edge of said first electrode and another side of said first electrode are opened so that an electric charge existing at the surface of said first dielectric film is movable to said first electrode for contacting with said first dielectric film via the edge of said first dielectric film, due to an electric field between said first and second electrodes.

7. A light diffraction modulation element as set forth in claim 5, wherein one of said adjoining first electrodes is displaced or deformed in a direction perpendicular to said common electrode in response to the application voltage for forming an electric field by which an electric charge having a high mobility at the surface of said common dielectric film is moved from said common electrode to said first electrode.

8. A light diffraction modulation element as set forth in claim 7, wherein a voltage is applied between one of adjoining said first electrodes and said common electrode so that the voltage is a high electrical potential at said common electrode and a low electrical potential at said one of said first electrode.

9. A light diffraction modulation element as set forth in claim 5, wherein said common dielectric film is formed by dielectric material having a hydrophilic boundary surface.

10. A light diffraction modulation element as set forth in claim 9, wherein said common dielectric film is formed by a silicon dioxide film or a silicon nitride film.

11. An image display device for irradiating irradiation light from a light source to a light diffraction modulation element to display an emitted light from said light diffraction modulation element at a display means to thereby form an image, said light diffraction modulation element comprising:

a common electrode;

a plurality of first electrodes oppositely arranged to said common electrode;

a common dielectric film formed at one side of said common electrode opposed to said first electrodes; and a first dielectric film formed at one side of said common electrode opposed to said first electrode, one of said adjoining first electrodes being displaced or deformed in a direction perpendicular to said common electrode when a voltage between one of the adjoining first electrodes and said common electrode is applied;

wherein an incident light strikes a plurality of the first electrodes to diffract light at a non-odd degree of diffraction light at a first status, and in a second status, incident light strikes a plurality of the first electrodes to diffract light at an odd degree of diffraction light; and said common dielectric film including dielectric material of which a mobility showing a degree of movement of an electric charge depending on a polarity of the electric charge, the electric charge existing at the surface of said common dielectric film, being aparted therefrom and moved by an electric field between said first electrode and said common electrode depends on a polarity of the electric charge.

12. An image display device as set forth in claim 11, wherein an edge of said first dielectric film, an edge of said first electrode and another side of said first electrode are opened so that an electric charge existing at the surface of said first dielectric film is movable to said first electrode contacting with said first dielectric film via the edge of said first dielectric film, due to an electric field between said first and second electrodes.

13. An image display device as set forth in claim 11, wherein one of the adjoining first electrode is displaced or deformed in a direction perpendicular to said common electrode in response to the application voltage for forming an electric field by which an electric charge having a high mobility at the surface of said common dielectric film is moved from said common electrode to said first electrode.

14. An image display device as set forth in claim 13, wherein a voltage is applied between one of adjoining said first electrode and said common electrode so that the voltage is a high electrical potential at said common electrode and a low electrical potential at said one of said first electrodes.

15. An image display device as set forth in claim 11, wherein said common dielectric film is formed by dielectric material having a hydrophilic boundary surface.

16. An image display device as set forth in claim 15, wherein said common dielectric film is formed by a silicon dioxide film or a silicon nitride film.

* * * * *